(12) United States Patent
Saternos et al.

(10) Patent No.: US 10,122,643 B2
(45) Date of Patent: Nov. 6, 2018

(54) SYSTEMS AND METHODS FOR REORGANIZATION OF MESSAGES IN QUEUING SYSTEMS

(71) Applicant: Synchronoss Technologies, Inc., Bridgewater, NJ (US)

(72) Inventors: Casimir Saternos, Emmaus, PA (US); Michael A. Bellomo, Center Valley, PA (US); Mortimer L. Smedley, III, Kutztown, PA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 316 days.

(21) Appl. No.: 15/207,867

(22) Filed: Jul. 12, 2016

(65) Prior Publication Data

US 2017/0026302 A1 Jan. 26, 2017

Related U.S. Application Data

(60) Provisional application No. 62/194,706, filed on Jul. 20, 2015.

(51) Int. Cl.
*G06F 15/16* (2006.01)
*H04L 12/863* (2013.01)
*H04L 12/865* (2013.01)

(52) U.S. Cl.
CPC ........ *H04L 47/624* (2013.01); *H04L 47/6275* (2013.01)

(58) Field of Classification Search
CPC ............................. H04L 47/62; H04L 47/6275
USPC .......................................................... 709/223
See application file for complete search history.

(56) References Cited

U.S. PATENT DOCUMENTS

| | | | |
|---|---|---|---|
| 6,983,317 B1 * | 1/2006 | Bishop | H04L 41/065 709/223 |
| 7,631,315 B2 * | 12/2009 | Dadiomov | G06F 9/546 709/238 |
| 2012/0246337 A1 * | 9/2012 | Ross | H04L 45/308 709/238 |

* cited by examiner

*Primary Examiner* — Glenford Madamba
(74) *Attorney, Agent, or Firm* — Synchronoss Technologies, Inc.; Frederick W. Dour (57) ABSTRACT

A method for the reorganization of messages in queuing systems is disclosed. The method comprising receiving a statement to reorganize one or more messages within an ordered data structure; translating the statement into a first set of instructions for identifying one or more messages on which to perform one or more operations, a second set of instructions for performing the one or more operations on the identified one or more messages, and a third set of instructions for storing, in a memory, the identified one or more messages after the one or more operations have been performed; executing the first set of instructions, the second set of instructions, and the third set of instructions on each message in the ordered data structure; and transmitting the operated upon messages.

14 Claims, 5 Drawing Sheets

SYSTEMS AND METHODS FOR REORGANIZATION OF MESSAGES IN QUEUING SYSTEMS

CROSS-REFERENCE TO RELATED APPLICATIONS

This application claims benefit of U.S. Provisional Patent Application Ser. No. 62/194,706, filed Jul. 20, 2015, which is herein incorporated by reference in its entirety.

BACKGROUND

Field

Embodiments consistent with the present invention generally relate to queuing systems and more specifically, to a system and method for reorganization of messages in queuing systems.

Description of the Related Art

Message queues are ordered data structures designed for holding messages prior to processing. In some ways, message queues are preferable to databases because message queues provide high performance, high concurrency, and scalable load balance such that tens of thousands of messages can be processed each second. In contrast, a database may process only a few hundred messages per second. However, messages in a queue cannot be accessed as easily as messages in a database.

Message queues typically order the messages in either a first-in-first-out (FIFO) or a last-in-first-out (LIFO) manner. Currently, regardless of the ordering used, a message in a queue is removed from the "head" of the queue using a call, for example to remove( ) or poll ( ). New elements are added at the "tail" of the queue. Messages may not be added to or removed from the middle of the queue. Structured Query Language (SQL) is a special-purpose programming language designed for managing data in a relational database management system. Similar systems and methods that allow management of messages, specifically for messages to be added or removed from the middle of a queue, have not been available.

A need therefore exists for systems and methods for management and reorganization of messages in queuing systems.

SUMMARY

A method and system for reorganization of messages in queuing systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other and further embodiments of the present invention are described below.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a system and method for reorganization of messages in queuing systems. A statement is received from a client application requesting to reorganize one or more messages within at least one queue. The statement is formatted as a Queue Query Language (QQL) statement. A library is used to translate the QQL statement into tokens and keywords that identify one or more operations that are to be performed on one or more messages in the queue(s). The statement may also include a modifier that identifies which messages in the queue are to be acted upon. For each of the one or more messages in the queue, the message at the head of the queue is popped off the queue. It is then determined whether the message is one to be acted upon based on the information in the received statement. If the message matches criteria thereby determining that the message is to be acted upon, the one or more operations identified in the statement are performed on the message. The message may be placed back on the queue, placed on a different queue, or deleted. In some embodiments, the acted upon messages are returned to the client application.

Various embodiments of systems and methods for reorganization of messages in queuing systems are provided below. In the following detailed description, numerous specific details are set forth to provide a thorough understanding of the claimed subject matter. However, it will be understood by those skilled in the art that claimed subject matter may be practiced without these specific details.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
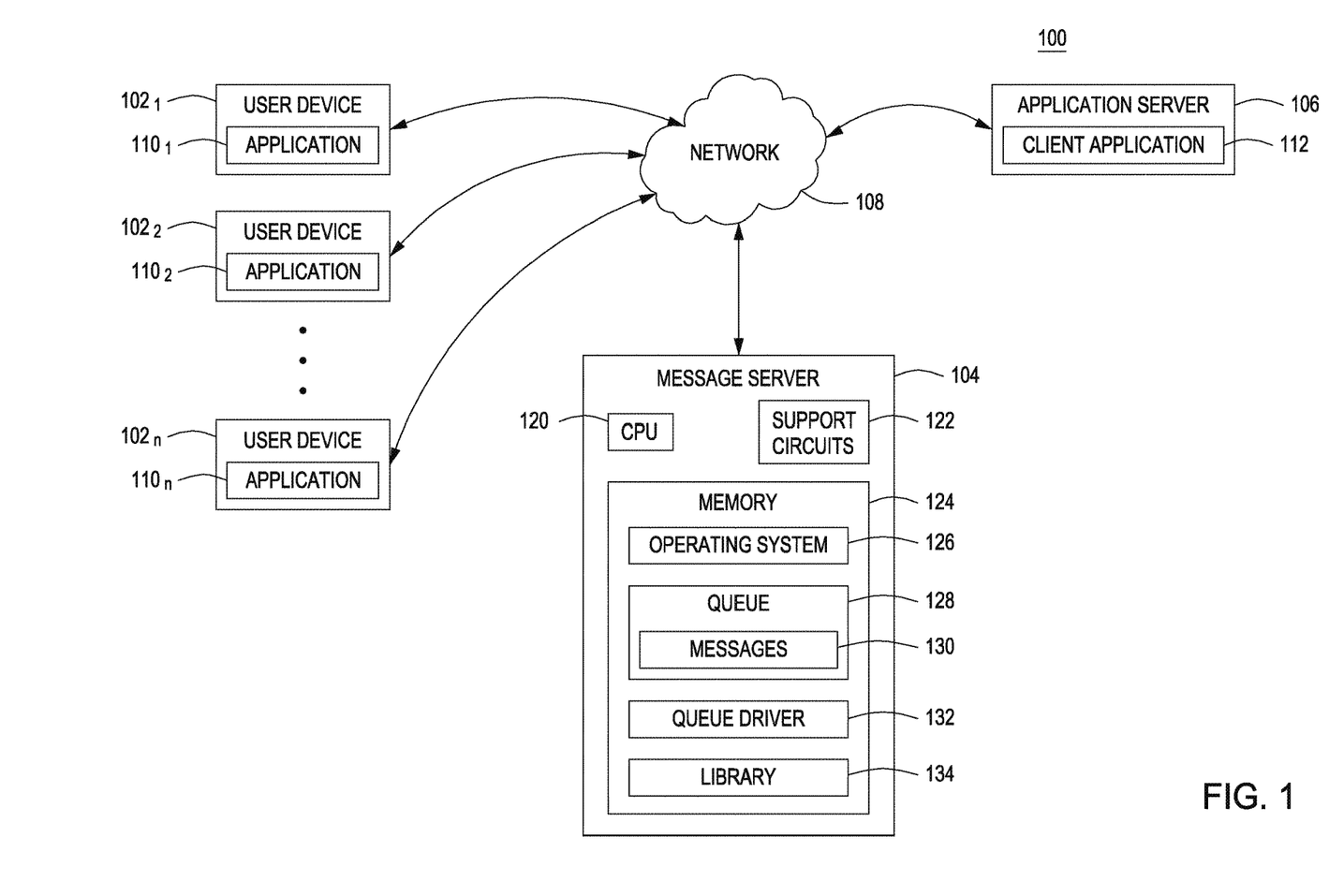
FIG. 1 is a block diagram depicting a system configured for reorganization of messages in queuing systems, according to one or more embodiments of the invention.

FIG. 1 is a block diagram depicting a system 100 configured for reorganization of messages in queuing systems, according to one or more embodiments of the invention. The various components of system 100 include a plurality of user devices $102_1, 102_2, \ldots 102_n$, (collectively referred to as user device 102), a messaging server 104, and an application server 106, communicatively connected via one or more network links. Some of the network links are established by a network 108, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

Figure 5:
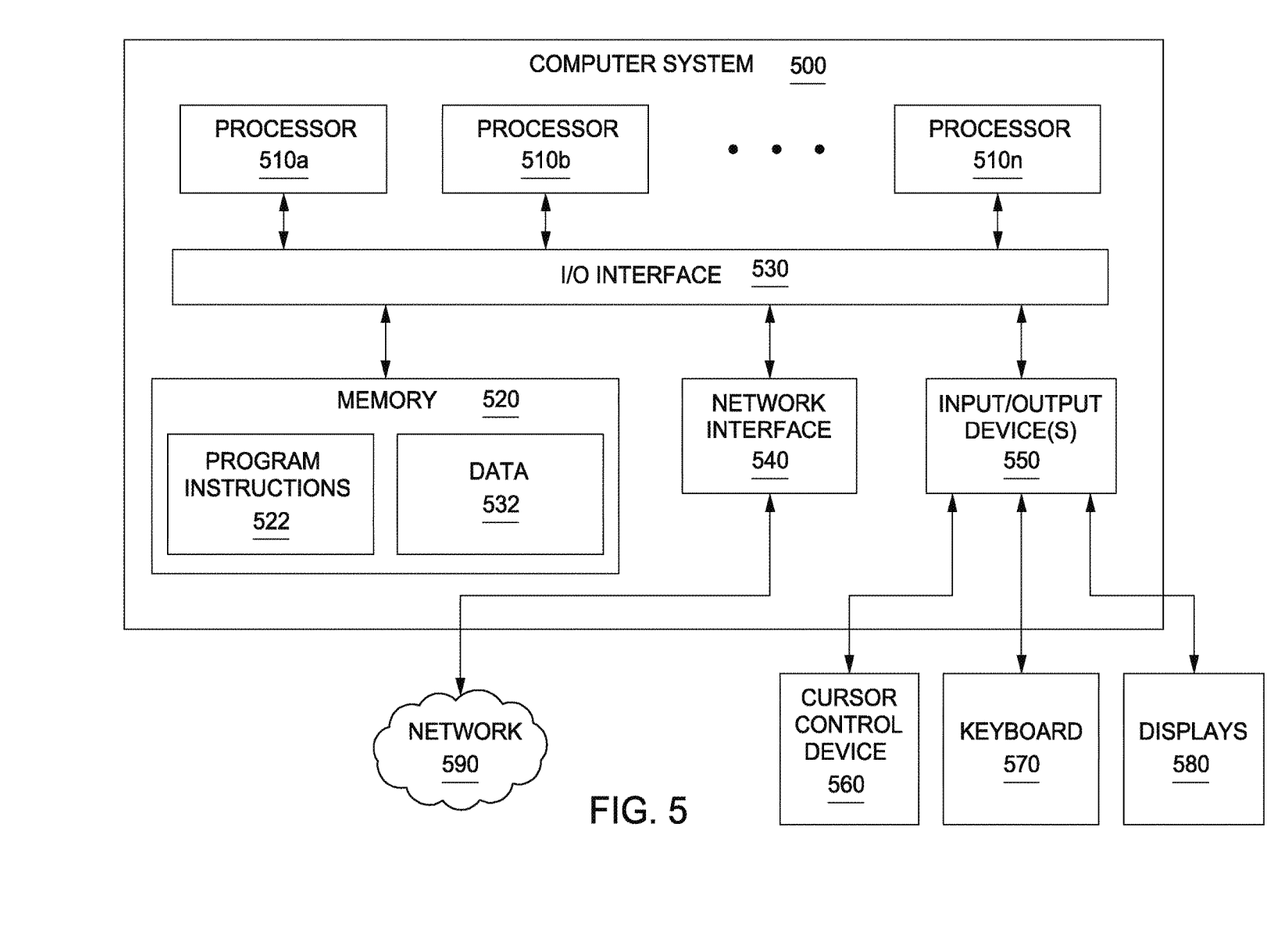
FIG. 5 is a detailed block diagram of a computer system, according to one or more embodiments.

The message server 104 is a computing device, for example, a desktop computer, laptop, tablet computer, and the like, or it may be a cloud based server e.g., a blade server, virtual machine, and the like. One example of a suitable computer is shown in FIG. 5, which will be described in detail below. According to some embodiments, the message server 104 includes a queue driver 132 that comprises a set of instructions residing in memory 124 and executable by a Central Processing Unit (CPU) 120. The CPU 120 may include one or more commercially available microprocessors or microcontrollers that facilitate data processing and storage. Various support circuits 122 facilitate the operation of the CPU 120 and include one or more clock circuits, power supplies, cache, input/output circuits, and the like. The memory 124 includes at least one of Read Only Memory (ROM), Random Access Memory (RAM), disk drive storage, optical storage, removable storage and/or the like.

In addition to the queue driver 132, the memory 124 includes an operating system 126, a queue 128, and a library 134. The queue includes one or more messages 130. Although a single queue is shown, in practice, a plurality of queues may exist in memory 124.

In some embodiments, the message server 104 interacts with user device 102 and application server 106 via a communication network 108. User device 102 may be implemented with computer workstations, personal digital assistants (PDAs), mobile telephones or any other devices. Each user device 102 includes an application 110 that is capable of sending messages to the message server 104 or interacting with an application capable of sending messages to the message server 104, which are stored in the queue 128.

The application server 106 is a computing device, for example, a desktop computer, laptop, tablet computer, and the like, or it may be a cloud based server e.g., a blade server, virtual machine, and the like. The application server 106 includes a client application 112 that may send requests to the message server 104 and receive messages from the message server 104.

The queue driver 132 receives a request from the client application 112 in the form of a QQL statement. The queue driver 132 translates the QQL statement into keywords and tokens using library 134. Library 134 includes rules for how to process the different keywords and tokens translated from the QQL statement as will be discussed in further detail with respect to FIG. 3 and FIG. 4 below. Queue 128 is an ordered data structure. The messages on the queue are stored in a logical order. As such, a second message in a queue cannot be removed from the queue before the first message is removed. In other words, the messages must be removed in order. In some embodiments, queue 128 is a topic queue. A topic queue is a queue that receives messages associated with a topic. For example, if a queue is named "Q", and also includes topics "A" and "B", then any messages published directly to the queue destination named "Q" or messages published to the topic destinations "A" and/or "B" are received and added to the queue named "Q".

Figure 2:
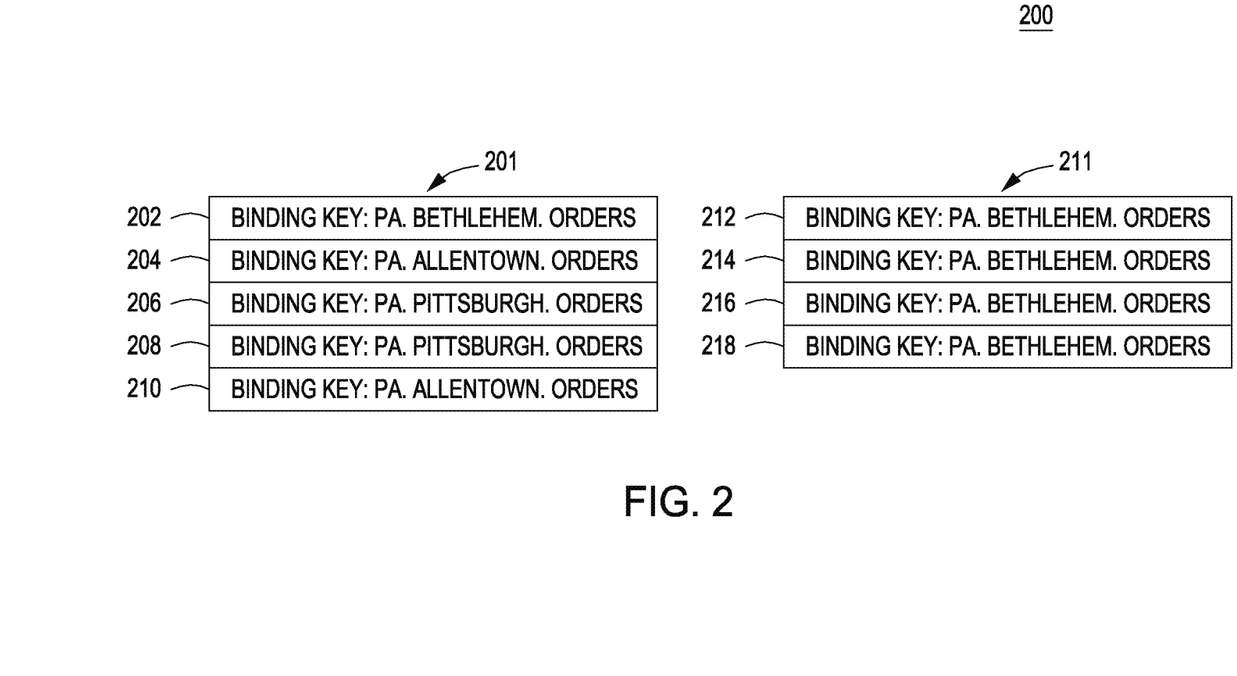
FIG. 2 is a block diagram depicting an exemplary embodiment of message queues, according to one or more embodiments of the invention.

FIG. 2 is a block diagram 200 depicting an exemplary embodiment of message queues (e.g., queue 128), according to one or more embodiments of the invention. Two queues, queue 201 and queue 211 are shown. Queue 201 holds messages of different types from given cities within the United States, for example messages associated with customer orders from an online clothing store. The queue 201 includes messages 202, 204, 206, 208, and 210. In the present example, message 202 is the first message (i.e., the head of the queue) and message 210 is the last message at the tail of the queue. Due to the constraints of queues, message 202 must be removed from the queue 201 before message 204 can be removed from the queue 201. No message from the middle of the queue (between the first message (i.e., message 202) and the last message (i.e., message 210) can be processed until those messages ahead of it in the ordered queue are processed. Queue 211 includes messages 212, 214, 216, and 218. Each message includes a state, a city within the state, and a type of message (e.g., an order, an order cancellation, and the like). The message format in the present example is JavaScript Object Notation (JSON), however, the message for may be in any format known in the art, such as plain text, Hypertext Markup Language (HTML), Extensible Markup Language (XML), and the like. In some embodiments, each message may have a priority assigned to the message.

In the present example, the queue 201 is named "Queue1", has a routing key of PA.*.Orders, and has a Description of "All messages associated with Pennsylvania orders". The asterisk ("*") in the routing key is a wild card that matches any city in Pennsylvania.

Each message in Queue1 is unique and each message has a binding key. The binding key is reconciled with a queue's routing key to determine whether the message is eligible to be placed on the queue. For example, the message 202 may appear as follows:

```
{
    "order_number": "123",
    "item_number": "333"
    "total_cost": "$9.99"
    ...
    "city": "bethlehem"
    "state": "pa"
    "zip": "18015"
    "color": "blue"
}
```

In the above example, message 202 has a binding key of PA.Bethlehem.Orders because the order came from the city of Bethlehem in Pennsylvania. Further in the present example, message 204 has a binding key of PA.Allentown.Orders, message 206 has a binding key of PA.Pittsburgh.Orders, message 208 has a binding key of PA.Pittsburgh.Orders, and message 210 has a binding key of PA.Harrisburg.Orders. The binding keys of the messages 202, 204, 206, 208, and 210 follow the format of the routing key PA.*.Orders. As such, because all of these messages are associated with orders from Pennsylvania, the messages were added to Queue1.

Queue 211 is named "Queue2", has a routing key of 'PA.Bethlehem.Orders', and has a Description of "All messages associated with Bethlehem, Pennsylvania orders". Due to the fact that the routing_key for Queue2 is PA.Bethlehem.Orders, only messages associated with orders from Bethlehem Pa. can be added to Queue2.

Each message may also include a priority, which is included in the metadata of a message, but is not part of the message. Each queuing system may support different metadata to meet the needs of the client application 112.

Figure 3:
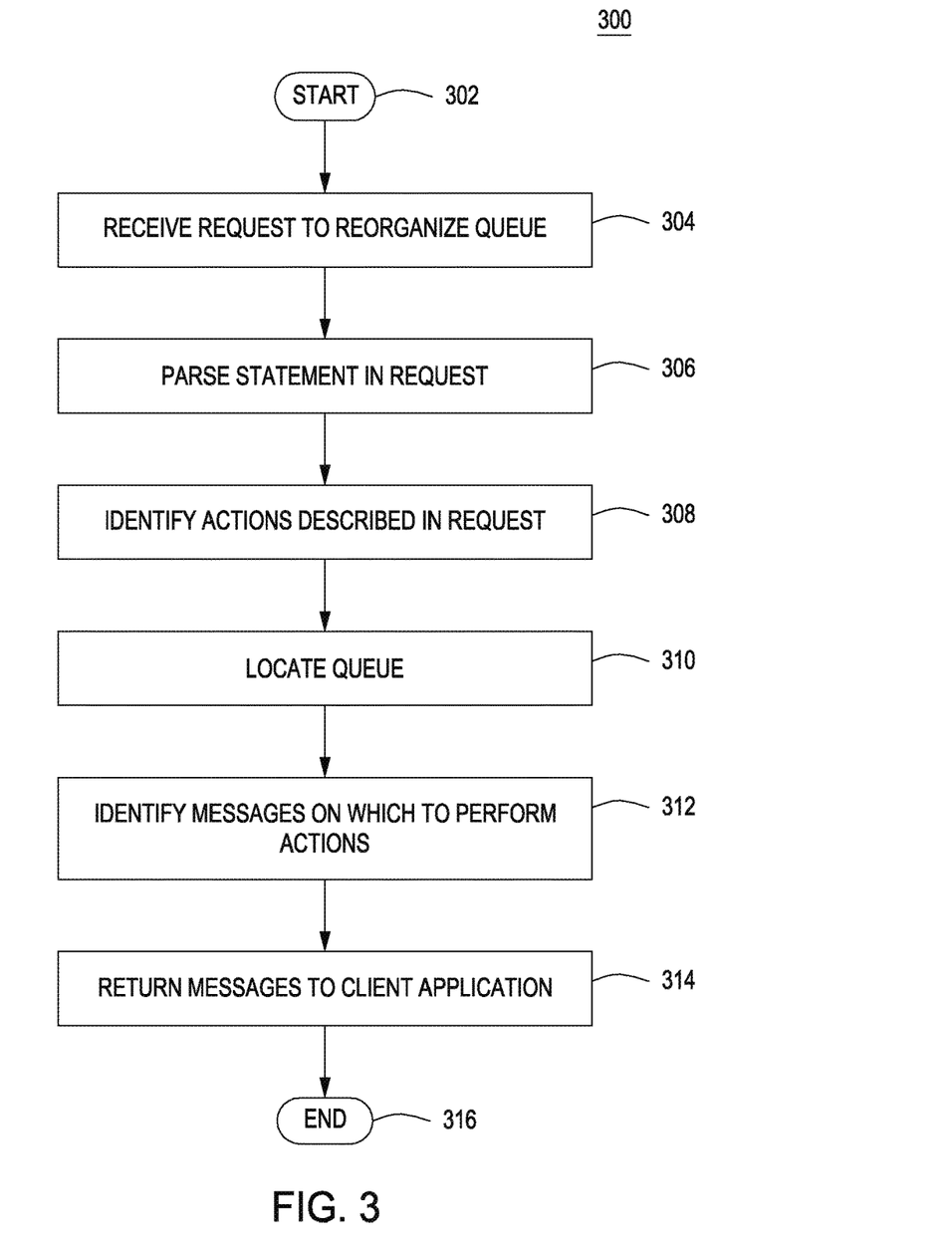
FIG. 3 depicts a flow diagram of a method for reorganizing messages on a queue, according to one or more embodiments.

FIG. 3 depicts a flow diagram of a method 300 for reorganizing messages on a queue, according to one or more embodiments. Prior to the initiation of the method 300, Queue1 is populated with five messages as described with respect to FIG. 2 above. The method 300 starts at step 302, and proceeds to step 304.

At step 304, the queue driver receives a request in the form of a Queue Query Language (QQL) statement to reorganize the queue. The request is typically received from a client application at an application server. In the present example, where the messages are associated with an online clothing store, the request may be received from the clothing store server, where the messages are to be processed and the orders filled. The QQL statement includes one or more operations to perform one or more specified queues. For example, a statement may be as follows:

```
SELECT   view *
FROM     Queue1
WHERE    routing_key = 'PA.Bethlehem.Orders'
```

In plain English, the client who sent the request would like to see all orders on Queue1 that are associated with Bethlehem, Pa. At step 306, the statement is translated into a first set of instructions for identifying one or more messages on which to perform one or more operations, a second set of instructions for performing the one or more operations on the identified one or more messages, and a third set of instructions for storing, in a memory, the identified one or more messages after the one or more operations have been performed. In order to translate the statement, the statement is parsed into tokens that constitute the keywords and operators of the QQL along with additional modifiers (e.g., routing_key) used to identify the messages in the queue on which to perform an action. The transformation is performed according to rules defined in a library on the message server.

At step 308, the one or more actions described in the second set of instructions are identified. In the present example, "view" is translated into an action to retrieve messages from a queue, specifically Queue1. Although in the present example, only one queue is being acted upon, in practice, a plurality of queues may be listed in the statement and therefore the action would be performed on all queues in the list. At step 310, the one or more queues are located. In the event a queue identified in the statement does not exist, an error message is returned.

At step 312, the messages within the queue(s) that are to be acted upon are identified by execution of the first set of instructions and the action is performed on each identified message, as described in further detail with respect to FIG. 4 below. At step 314, the operated upon messages are transmitted to the client application that sent the request. The method ends at step 316.

Figure 4:
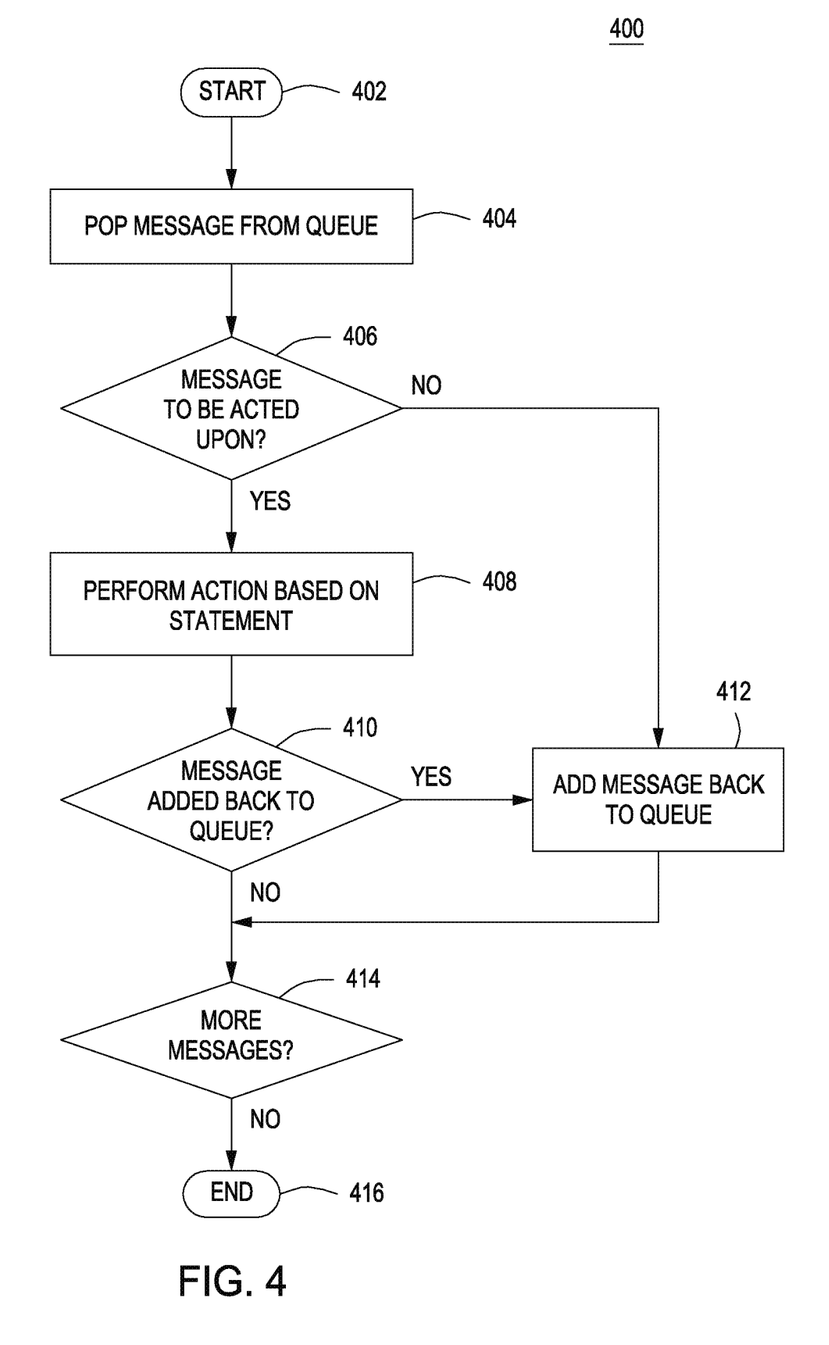
FIG. 4 is a flow diagram depicting a method for iterating through messages in queuing systems, in accordance with one or more embodiments of the present invention.

FIG. 4 is a flow diagram depicting a method 400 for iterating through messages in queuing systems, in accordance with one or more embodiments of the present invention. The method 400 starts at step 402 and proceeds to step 404.

At step 404, a message referred to as the "head" of the queue is popped off the queue. Popping a message off the queue removes the message from the head of the queue so it can be evaluated. At step 406, it is determined whether the message popped from the queue is to be acted upon. The QQL statement includes a modifier that identifies which messages in the queue(s) are to be acted upon. In the present example, the modifier is "routing_key='PA.Bethlehem.Orders'". As such, the binding key of the popped message is compared to the modifier, in the present example, the routing_key. If the routing_key matches the binding key of the message, the message is identified as matching the selection criteria and therefore the message is one on which an action is to be performed.

If at step 406, it is determined that the routing_key of the message does not match the binding key message and therefore the message is not one to be acted upon, then at step 412, the messaged is added back onto the tail of the queue and the method proceeds to step 414.

However, if at step 406, it is determined that the message is to be acted upon, then at step 408, the one or more actions as executed in the second set of instructions are performed on the message. For example, in the present example, the action is "view" which when translated into a token means "retrieve". The third set of instruction are executed in order to store the acted upon message. In some embodiments, when the message is retrieved, the message is returned to the client program. In some embodiments, when the message is retrieved, the message is stored in memory, a second queue, or cache until all messages in the queue have been evaluated and the messages are returned to the client program together.

In another example, a QQL statement may be:

```
DELETE
FROM     Queue1
WHERE    routing_key = 'PA.Bethlehem.Orders'
```

In such an example, the statement is translated to "retrieve" any message from Queue1 where the routing_key 'PA.Bethlehem.Orders' matches the binding key and when message is retrieved, the message is not stored anywhere, and simply deleted.

In yet another example, the QQL statement may be:

```
INSERT INTO Queue2
SELECT   retrieve*
FROM     Queue1
WHERE    routing_key = 'PA.Bethlehem.Orders'
```

In such an example, the statement is translated to "retrieve" any message from Queue1 where the routing_key 'PA.Bethlehem.Orders' matches the binding key, and the message is added onto a queue named Queue2.

In yet another example, the QQL statement may be:

```
CREATE QUEUE newQueue AS
SELECT   view *
FROM     Queue1
WHERE    priority = 3
```

In such an example, the statement is translated to create a new queue, retrieve any message from Queue1 that has a priority of 3, and add the message to the new Queue. The provided examples are not meant to be exhaustive. Any type of QQL statements may be used as long as the library includes a translation of each statement into keywords and tokens with rules associated for acting on the message.

At step 410, it is determined whether, based on the action in the statement, whether the message should be added back onto the queue. The library that defines the transformation of the QQL statement also includes rules for what additional actions are to be taken based on the keywords and tokens. For example, a rule may indicate that after processing, the message should be returned to the queue. If such a rule exists, then at step 412, the message is added back onto the tail of the queue. For example, a QQL query that includes the term "view" indicates, based on rule in the library, that a matching message is to be added back onto the queue. A QQL query that includes the term "retrieve" may indicate that a matching message is not to be added back onto the queue. A QQL query that includes the term "delete" may indicate that the matching message is not to be added back onto the queue.

At step 414, it is determined whether there are more messages in the queue(s) to be evaluated. If there are no more messages in the queue(s) that need to be evaluated, the method 400 ends at step 416. However, if at step 414, it is determined that additional messages in the queue(s) need to be evaluated, then the method proceeds to step 404 and iterates until all messages in the queue(s) have been evaluated, at which time the method proceeds to step 416 and ends.

In the event that a QQL statement is invalid (e.g., not defined in the library), a queue provided in a QQL statement does not exist, at QQL statement states to create a queue that already exists, an error is thrown and processing is stopped. These are merely example of error handling. No queue is operated on in the event of an error due to invalid syntax, or invalid queue name references.

FIG. 5 is a detailed block diagram of a computer system, according to one or more embodiments, that can be utilized in various embodiments of the present invention to implement the computer and/or the display devices, according to one or more embodiments.

Various embodiments of method and apparatus for coordinating users with common interests to attend an event together, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement method 300 (FIG. 3), and method 400 (FIG. 4) as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more display devices (not shown), or one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more communication terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 3 and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method of providing reorganization of messages in queuing systems, the method comprising:
   receiving a statement to reorganize one or more messages within a first ordered data structure;
   translating the statement into a first set of instructions for identifying one or more messages on which to perform one or more operations, a second set of instructions for performing the one or more operations on the identified one or more messages, and a third set of instructions for storing, in a memory, the identified one or more messages after the one or more operations have been performed;
   executing the first set of instructions to identify the one or more messages on which to perform the one or more operations wherein executing the first set of instructions for each of the one or more messages in the first ordered data structure comprises:
   popping the message from the first ordered data structure;
   determining whether the message is to be acted upon based on the identified one or more operations comprising matching a routing key from the statement to a binding key of the message;
   determining, based on the identified one or more operations, whether to add the message back onto the first ordered data structure; and
   adding the message back onto the first ordered data structure when it is determined based on the identified one or more operations;
   executing the second set of instructions to perform the one or more operations on the identified one or more messages;
   executing the third set of instructions to store the one or more identified messages after the one or more operations have been performed; and
   transmitting the operated upon messages; and
   returning an error message when one of a statement including invalid syntax is received, an ordered data structure referenced in the statement does not exist, or that statement identifies an ordered data structure to be created that already exists.

2. The method of claim 1, wherein the first ordered data structure is a first topic queue.

3. The method of claim 2, wherein the one or more messages identified are logically stored between a first message in the first topic queue and a last message in the first topic queue.

4. The method of claim 1, wherein executing the third set of instructions comprises storing the messages in a second ordered data structure.

5. The method of claim 1, wherein each of the one or more messages in the first ordered data structure comprises metadata comprising at least a binding key.

6. The method of claim 1, wherein the one or more operations include at least one of retrieve a message, delete a message, or move a message to a different queue.

7. The method of claim 1, wherein the one or more operations further includes creating a third ordered data structure.

8. A system of providing reorganization of messages in queuing systems, comprising:
   a) at least one processor;
   b) at least one input device; and
   c) at least one storage device storing processor-executable instructions which, when executed by the at least one processor, perform a method including:
   receiving a statement to reorganize one or more messages within a first ordered data structure;
   translating the statement into a first set of instructions for identifying one or more messages on which to perform one or more operations, a second set of instructions for performing the one or more operations on the identified one or more messages, and a third set of instructions for storing, in a memory, the identified one or more messages after the one or more operations have been performed;
   executing the first set of instructions to identify the one or more messages on which to perform the one or more operations wherein executing the first set of instructions for each of the one or more messages in the first ordered data structure comprises:
   popping the message from the first ordered data structure;
   determining whether the message is to be acted upon based on the identified one or more operations comprising matching a routing key from the statement to a binding key of the message;
   determining, based on the identified one or more operations, whether to add the message back onto the first ordered data structure; and
   adding the message back onto the first ordered data structure when it is determined based on the identified one or more operations;
   executing the second set of instructions to perform the one or more operations on the identified one or more messages;
   executing the third set of instructions to store the one or more identified messages after the one or more operations have been performed; and
   transmitting the operated upon messages; and
   returning an error message when one of a statement including invalid syntax is received, an ordered data structure referenced in the statement does not exist, or that statement identifies an ordered data structure to be created that already exists.

9. The system of claim 8, wherein the first ordered data structure is a first topic queue.

10. The system of claim 9, wherein the one or more messages identified are logically stored between a first message in the first topic queue and a last message in the first topic queue.

11. The system of claim 8, wherein executing the third set of instructions comprises storing the messages in a second ordered data structure.

12. The system of claim 8, wherein each of the one or more messages in the first ordered data structure comprises metadata comprising at least a binding key.

13. The system of claim 8, wherein the one or more operations include at least one of retrieve a message, delete a message, or move a message to a different queue.

14. A method of providing reorganization of messages in queuing systems, the method comprising:
   receiving a statement to reorganize one or more messages within a first queue;
   identifying one or more operations described in the statement that are to be performed on one or more messages in the first queue;
   identifying one or more messages logically stored between a first message in the first queue and a last message in the first queue on which to perform the one or more operations, wherein identifying each of the one or more messages logically stored between the first message in the first queue and the last message in the first queue comprises:

popping the message from the first queue;

determining whether the message is to be acted upon based on the identified one or more operations comprising matching a routing key from the statement to a binding key of the message;

determining, based on the identified one or more operations, whether to add the message back onto the first queue; and adding the message back onto the first queue when it is determined based on the identified one or more operations;

performing the one or more operations on the identified one or more messages; and returning the operated upon messages; and returning an error message when one of a statement including invalid syntax is received, an ordered data structure referenced in the statement does not exist, or that statement identifies queue to be created that already exists.

\* \* \* \* \*